July 22, 1969　　H. OBERTHUR　　3,456,443
BRAKE-FORCE REGULATOR
Filed Sept. 18, 1967
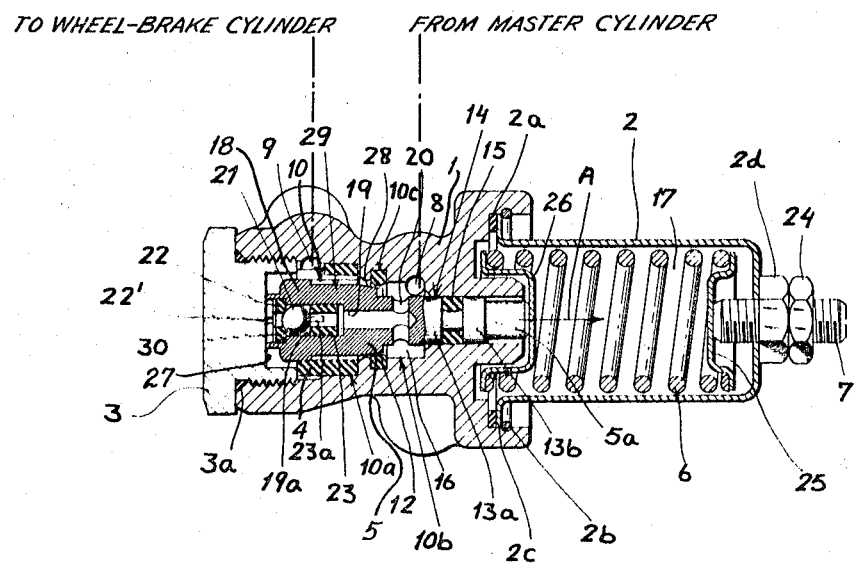
Heinrich Oberthur
INVENTOR.
BY Karl F. Ross
Attorney

United States Patent Office 3,456,443
Patented July 22, 1969

3,456,443
BRAKE-FORCE REGULATOR
Heinrich Oberthur, Offenbach-Rumpenheim, Germany, assignor to Alfred Teves G.m.b.H., Frankfurt am Main, Germany, a corporation of Germany
Filed Sept. 18, 1967, Ser. No. 668,517
Int. Cl. F15b 5/00
U.S. Cl. 60—54.5                                    13 Claims

ABSTRACT OF THE DISCLOSURE

A brake-force regulator in which noise and frictional wear of the sealing surfaces are avoided by providing the large-diameter step of the piston of the regulator, which subdivides the bore of the regulator housing into a working chamber communicating with the master cylinder and containing the small-diameter step and a working chamber communicating with the wheel-brake cylinder, with a frustoconical or beveled surface which cooperates with a sealing ring set into the wall of the bore to provide a throttling clearance between the two chambers as the stepped piston is shifted to finally block communication between the chambers, whereby the fluid flow is gradually terminated and the large step sealingly cooperates with the ring when the brake is released. The piston is provided with a ball-type check valve forming a throttling channel between the chambers which is opened when the piston differential in favor of return flow of fluid from the wheel-brake cylinder to the master cylinder exceeds a predetermined threshold value.

---

My present invention relates to a brake-force regulator and, more particularly, to a regulating valve in the brake path between the master cylinder and the wheel-brake cylinder of an automotive vehicle designed to vary the braking efficiency in accordance with the degree of actuation of the brake pedal.

In my prior Patents No. 3,167,360, No. 3,169,800 and No. 3,233,947 I have described load-responsive vehicle brake regulators and devices designed to vary the braking effectiveness in accordance with the degree of actuation of the brake pedal in which a differential piston exposed to the fluid pressure of the master cylinder is effective to operate a control valve in the hydraulic line between the master cylinder and the wheel-brake cylinder to vary the aperture of the hydraulic path, a spring biasing this valve against the differential piston.

A brake regulator of this type has a braking force characteristic considered in terms of the braking effectiveness plotted against the foot pressure on the brake pedal which, at a transition or switchover point at which the valve closes so that further pressurization of the wheel-brake cylinder is effected via the force-transmitting piston, has a brake or sharp bend (kink) which is altered in dependence upon the load upon the vehicle wheels. To permit control of this transition point in accordance with the axle of the vehicle, a feedback of mechanical or hydraulic character is provided, this feedback usually controlling the stress upon the spring which resists displacement of the differential piston. It has been found to be desirable to control not only the restoring force or the counter-acting force of the spring but also the point at which the valve closes in the stroke of the differential piston within its cylinder bore. In this manner, an effect can be produced which corresponds to that obtained upon the modification of the effectiveness of the valve spring.

While such brake regulators have proved to be highly effective, several problems have been encountered with them. The stepped piston is generally biased by the prestressed spring means into an extreme position in which a valve member carried thereby is held open against the force of a smaller spring. When the wheel-brake cylinder is to be reconnected with the master cylinder (upon release of the brake), the piston is shifted away from the wall of the housing and the valve is permitted to close. Thus, there is a strong dependence of the regulator characteristic upon the friction between the housing and the piston which sometimes overrides the effect of the spring in determining the transition point or slope of the characteristic. Furthermore, when the brake pedal is suddenly released, the instantaneous rise in pressure differential across the stepped piston produces an impact-like movement thereof and regulator noise which is not only annoying but also indicative of mechanical stress causing early decline in the effectiveness of the check valve.

It is, therefore, the principal object of the present invention to provide an improved brake-force regulator of the general character described wherein, however, the friction of the stepped piston is reduced, the device is responsive to relatively small pressure differentials, the piston is unaffected by sticking and wear, and noise and wear of the check valve are precluded.

This object and others which will become apparent hereinafter are attained in accordance with the present invention, by providing, in a braking-force regulator designed to reduce the force transmitted to the wheel-brake cylinder at a predetermined point in the depression of the brake pedal (which may be modified in terms of the load on the rear-wheel axle in the manner described in the aforementioned patents), an arrangement wherein the stepped piston is not continuously in sealing engagement with the housing but cooperates therewith to form a throttle valve gradually narrowing communication around the outer surfaces of the piston and finally terminating it entirely. I have found that this arrangement eliminates practically all frictional wear of the seal and stepped piston and indeed eliminates all sealing engagement of the large-diameter step of the piston with the piston with the wall of the housing until such friction no longer can be significant with respect to the characteristic of the regulator.

Thus, a brake regulator according to the present invention comprises a regulator housing having a cylinder bore in which a stepped piston is slidable against an adjustable and preset resilient force, while subdividing the bore into a first working chamber communicating with the master cylinder and receiving the small-diameter step of the piston to effectively urge it in the direction of the resilient bias and a second working chamber communicating with the wheel-brake cylinder and effective to apply pressure to the large-diameter step. Thus, when the pressure differential suffices to close the newly provided throttle valve between the housing and the outer periphery of the large-diameter step, the piston is gradually induced to move against the restoring force and reduce, in turn, the brake force applied to the wheel-brake cylinder in terms of the brake pedal travel.

According to an essential feature of this invention, a part of the large step of the longitudinally shiftable stepped piston, which is slidable in a guide sleeve in the cylinder bore, is provided with a frustoconical or beveled surface which cooperates with a sealing ring seated in the wall of the bore to form a throttle valve permitting throughflow of fluid between the chambers around the stepped piston during initial actuation of the brake pedal. As the brakes become effective and the pressure builds up in the second chamber, the piston is shifted in the direction of convergence of the bevel into the ring. Finally, the ring sealingly engages the large-diameter step, e.g. at a portion of intermediate diameter, and sealingly terminates communication between the chambers. Preferably, the stepped piston is provided with a ball-type check valve in a channel which is unblocked when the brake pedal is released to form a throttle allowing flow of hydraulic fluid through the stepped piston and return thereof to its initial position. The sealing ring, which preferably has an inwardly bulging inner periphery, may be composed of an elastomeric material such as synthetic resin, rubber or the like or of a metal, such as brass.

The above and other objects, features and advantages of the present invention will become more readily apparent from the following description, reference being made to the accompanying drawing in which the sole figure is an axial cross-sectional view of a brake-regulating valve, according to the invention.

In the drawing, I show a brake housing 1 having a spring case 2 connected therewith via a sealing ring 2a and a split locking ring 2b which engage the outwardly extending flange 2c of the housing 2. Within the cage or cage 2, I provide a compression-type helicoidal coil spring 6 which bears axially in the direction of arrow A against a seating ring 25 abutting an adjusting screw 7 threaded into a nut 2d welded axially to the cage 2. The screw 7 can be locked at any adjusted axial position via the counternut 24.

At its other axial extremity, the spring 6 bears against spring cage 2 connected therewith via sealing ring 2a a stepped piston 5 axially shiftable in a cylinder bore 10 of the valve housing 1. At one end, the bore of this housing is closed by a plug 3 and a seal 3a cooperating therewith. The housing 1 is provided with a fluid inlet 8 communicating with the master cylinder of a vehicle brake system (see, for example, U.S. Patent 3,169,800) and with a fluid outlet 9 communicating with the wheel-brake cylinder, as also illustrated and described in this patent. The ports 8 and 9 communicate with respective working chambers 16 and 27 of the cylinder bore into which the latter is divided axially by the stepped piston 5. The cylinder bore has a recess 10a in which a guide sleeve 4 is anchored with no freedom of axial movement, a recess 10c in which an inwardly bulging metallic or elastomeric sealing ring 12 is received and a cylindrical portion 10b defining the chamber 16. The stepped piston 5 has a pair of cylindrical portions 13a and 13b which are slidably received within the axial extension 14 of the cylinder bore. A further sealing ring 15 is received between the bosses 13a and 13b and sealingly engages the wall of bore 14.

The stepped piston 5 has a forward end or head 18 which is received in the guide sleeve 4 and is provided with an axial passage 19 communicating via radial bores 20 behind the head 18 with the working chamber 16. At its other end, the passage 19 is provided with a check valve which comprises a ball 21 retained between an annular valve seat 22 whose surface, engageable with the ball 21, may be of spheroidal configuration to ensure sealing cooperation between them. A retaining cap 30 holds the elastomeric seat 22 in place. Within the enlargement 19a of the throughgoing passage in which the check valve is provided, there is disposed a sleeve 23 forming a stop for the ball 21 when the fluid flows in the direction of arrow A through this valve and is throttled by the narrow passage 23a in the sleeve.

The stepped piston 5 bears, under the action of spring 6 against the plug 3 which is threaded into the left-hand end of the cylinder bore and clamps the seal 3a against the housing 1. Thus, a chamber 27 is defined in the cylinder bore and is designed to receive hydraulic fluid under pressure which acts upon the head 18 of the large-diameter portion of the stepped piston. Chamber 27 communicates via a port 9 with the wheel-brake cylinder of the wheels of the automotive vehicle (see Patent No. 3,167,360). The stepped piston 5 has, moreover, a frustoconical or beveled surface 28 at the junction between the small-diameter step 13a, 13b of the piston and an intermediate step 29 of this large diameter portion of generally cylindrical configuration. The step 29 has a diameter which, in turn, is slightly less than that of the head 18.

Upon actuation of the brake, i.e. by stepping upon the brake pedal, hydraulic fluid is forced from the master cylinder through the fluid inlet port 8 into the annular compartment 16 surrounding the small-diameter step of piston 5; from chamber 16, the fluid passes between the frustoconical surface 28 and the sealing ring 12 (which is seated in groove 10c) into chamber 27 around the intermediate-diameter step 29 and thence to the outlet port 9 to pressurize the wheel-brake cylinder. It will be clear, therefore, that the pressure transmitted to the wheel-brake cylinder is in direct proportion to the pressure applied by the master-cylinder piston and the force applied to the brake pedal by the vehicle operator. The brake characteristic (i.e. the graph of braking force, plotted as the ordinate, against foot pressure on the pedal, plotted as the absicissa) is thus linear during the full period of direct transmission of fluid through the regulator. Friction between the cylinder bore and stepped piston has no effect on the characteristic.

When a predetermined pressure builds up in the wheel-brake cylinder and, therefore, in chamber 27 of the regulator, the pressure differential in favor of movement of the piston 5 in the direction of arrow A against the force of spring 6 suffices to shift the piston 5 to the right and provide a throttling of the flow between chambers 16 and 27 whereby the ratio of pressure increase at chamber 27 to the pressure increase in chamber 16 (with further depression of the brake pedal) is altered as set forth in the aforementioned patents. The throttling action is effected between the frustoconical surface 28 and the sealing ring 12. When the pressure at inlet port 8 and chamber 16 reaches a constant value, the piston 5 is shifted to its extreme right-hand position in which the fluid passage between ring 12 and valve surface 28 is completely closed.

When the pressure in chamber 16 falls sharply, the piston 5 shifts to the right further to maintain pressure equality between chambers 16 and 27. Such drop in pressure in chamber 16 results from a release of the brake pedal by the operator. When the piston 5 reaches an extreme right-hand position, e.g. as a result of the further drop in pressure in chamber 16, the check valves 21, 22, 23 and 30 opens to permit hydraulic fluid to flow through the passage 19, the throttle slot 22' and the transverse bore 20 into passage 16. The net fluid-flow cross-section is so designed, by proper dimensioning of the diameter of the ball 21, that the movement of the piston 5 under the force of spring 6 in the direction opposite to arrow A, i.e. to the left, is carried out relatively slowly. It will be evident that the characteristic of the pressure reducing valve here described can be varied by changing the spring 6 whose stiffness, of course, determines the point at which the valves 28, 12 will close completely and the rate of throttling adjusted. A similar adjustment can be made via the screw 7, counternut 24 and spring plate 25 which adjust the precompression of spring 6. It is, however, also possible to adjust the characteristic accurately and reproductively merely by replacing the piston 5 with a similar stepped piston whose valve surface 28 has a different conicity, taper or convergence angle.

The invention described and illustrated is believed to admit of many modifications within the ability of persons skilled in the art, all such modifications being considered within the spirit and scope of the appended claims.

I claim:
1. A brake regulator interposable between a master cylinder and a wheel-brake cylinder of an automotive vehicle braking system, said regulator comprising:
   a regulator housing forming a cylinder bore;
   a stepped piston reciprocable in said bore and defining therein a pair of working chambers respectively communicating with said master cylinder and said wheel-brake cylinder;
   means forming a passage between said chambers for initially permitting throughflow of fluid between said chambers upon application of braking force to the master cylinder and subsequently effecting force transmission between said chambers via said piston;
   means including a frustoconical valve surface formed on the outer periphery of said piston and a valve ring disposed along said bore and co-operating with said surface upon movement of said stepped piston to throttle the throughflow of fluid between said chambers around said stepped piston, said stepped piston having a relatively small-diameter step exposed to pressure within the chamber communicating with said master cylinder and effective to urge said piston in one direction, and a relatively large-diameter step exposed to fluid pressure in the chamber communicating with said wheel-brake cylinder and effective under fluid pressure to urge said piston in the opposite direction;
   check-valve means in said piston enabling restricted fluid flow between said chambers upon inactivation of said master cylinder; and
   resilient means acting upon said piston to yieldably resist displacement in said other direction and to shift said piston in said one direction upon relief of fluid pressure at said large-diameter step.

2. The improvement defined in claim 1 wherein said large-diameter step sealingly engages said ring upon movement of said piston in said other direction whereby communication between said chambers around said piston is blocked during movement of said piston into sealing engagement with said ring.

3. A brake regulator interposable between a master cylinder and a wheel-brake cylinder of an automotive vehicle braking system, said regulator comprising:
   a regulator housing forming a cylinder bore;
   a stepped piston reciprocable in said bore and defining therein a pair of working chambers respectively communicating with said master cylinder and said wheel-brake cylinder;
   means forming a passage between said chambers for initially permitting throughflow of fluid between said chambers upon application of braking force to the master cylinder and subsequently effecting force transmission between said chambers via said piston;
   means including a frustoconical valve surface formed on the outer periphery of said piston and a valve ring disposed along said bore and co-operating with said surface upon movement of said stepped piston to throttle the throughflow of fluid between said chambers around said stepped piston, said stepped piston having a relatively small-diameter step exposed to pressure within the chamber communicating wtih said master cylinder and effective to urge said piston in one direction, and a relatively large-diameter step exposed to fluid pressure in the chamber communicating with said wheel-brake cylinder and effective under fluid pressure to urge said piston in the opposite direction;
   resilient means acting upon said piston to yieldably resist displacement in said other direction and to shift said piston in said one direction upon relief of fluid pressure at said large diameter step, said large-diameter step sealingly engaging said ring upon movement of said piston in said other direction whereby communication between said chambers around said piston is blocked during movement of said piston into sealing engagement with said ring; and
   check-valve means in said piston forming a throttling channel upon opening of said check-valve means, said check-valve means being closed to prevent fluid communication between said chambers through said piston upon the pressure in the chamber communicating with said master cylinder exceeding a predetermined pressure differential beneath the pressure in the chamber communicating with said wheel-brake cylinder and opening upon the presure differential between the latter chamber and the former exceeding said predetermined differential.

4. The regulator defined in claim 3 wherein said check-valve means is a ball valve whose ball diameter defines at least in part the throttling cross-section of said channel.

5. The regulator defined in claim 4 wherein said resilient means is a precompressed coil spring bearing upon said piston, said regulator further comprising means for regulating the precompression of said coil spring.

6. The regulator defined in claim 3 wherein said ring is formed with an inwardly convex inner surface.

7. The regulator defined in claim 3 wherein said ring is composed of elastomeric material.

8. A brake regulator interposable between a master cylinder and a wheel-brake cylinder of an automotive vehicle braking system, said regulator comprising:
   a regulator housing forming a cylinder bore;
   a stepped piston reciprocable in said bore and defining therein a pair of working chambers respectively communicating with said master cylinder and said wheel-brake cylinder;
   means forming a passage between said chambers for initially permitting throughflow of fluid between said chambers upon application of braking force to the master cylinder and subsequently effecting force transmission between said chambers via said piston;
   means including a frustoconical valve surface formed on the outer periphery of said piston and a valve ring disposed along said bore and cooperating with said surface upon movement of said stepped piston to throttle the throughflow of fluid between said chambers around said stepped piston, said stepped piston having a relatively small-diameter step exposed to pressure within the chamber communicating with said master cylinder and effective to urge said piston in one direction, and a relatively large-diameter step exposed to fluid pressure in the chamber communicating with said wheel-brake cylinder and effective under fluid pressure to urge said piston in the opposite direction;
   resilient means acting upon said piston to yieldably resist displacement in said other direction and to shift said piston in said one direction upon relief of fluid pressure at said large-diameter step, said large-diameter step sealingly engaging said ring upon movement of said piston in said other direction whereby communication between said chambers around said piston is blocked during movement of said piston into sealing engagement with said ring; and
   a sealing sleeve received in said housing and cooperating with said large-diameter step of said piston to sealingly close communication between said chambers upon said ring and said surface attaining maximum restriction of the flow between the chambers about said piston.

9. The regulator defined in claim 8, further comprising check-valve means in said piston forming a throttling channel upon opening of said check-valve means, said check-valve means being closed to prevent fluid communication between said chambers through said piston upon the pressure in the chamber commuincating with said master cylinder exceeding a predetermined pressure differential beneath the pressure in the chamber communicating with said wheel-brake cylinder and opening upon the pressure differential between the latter chamber and the former exceeding said predetermined differential.

10. The improvement defined in claim 9 wherein said check-valve means is a ball valve whose ball diameter defines at least in part the throttling cross-section of said channel.

11. The improvement defined in claim 10 wherein said resilient means is a precompressed coil spring bearing upon said piston, said regulator further comprising means for regulating the precompression of said coil spring.

12. The improvement defined in claim 8 wherein said ring is formed with an inwardly convex inner surface.

13. The improvement defined in claim 8 wherein said ring is composed of elastomeric material.

References Cited

UNITED STATES PATENTS

| | | | |
|---|---|---|---|
| 2,061,780 | 11/1936 | Short | 277—236 |
| 2,399,270 | 4/1946 | Vickers. | |
| 3,173,264 | 3/1965 | Hazeltine. | |
| 3,209,542 | 10/1965 | Francia. | |
| 3,245,221 | 4/1966 | James et al. | |

MARTIN P. SCHWADRON, Primary Examiner

ROBERT R. BUNEVICH, Assistant Examiner

U.S. Cl. X.R.

303—6, 22